United States Patent
Trummer et al.

(10) Patent No.: US 8,362,788 B2
(45) Date of Patent: Jan. 29, 2013

(54) DOUBLE PISTON ROD

(75) Inventors: Guenther Trummer, Baiersdorf (DE); Ralf Gehring, Feldkirchen (DE)

(73) Assignee: Astyx GmbH, Ottobrunn (DE)

( * ) Notice: Subject to any disclaimer, the term of this patent is extended or adjusted under 35 U.S.C. 154(b) by 457 days.

(21) Appl. No.: 12/673,754

(22) PCT Filed: Aug. 18, 2008

(86) PCT No.: PCT/EP2008/006778
§ 371 (c)(1), (2), (4) Date: Mar. 16, 2010

(87) PCT Pub. No.: WO2009/021755
PCT Pub. Date: Feb. 19, 2009

(65) Prior Publication Data
US 2011/0063160 A1    Mar. 17, 2011

(51) Int. Cl.
G01R 27/32 (2006.01)
G01S 13/08 (2006.01)
(52) U.S. Cl. .......................... 324/644; 324/642; 342/127
(58) Field of Classification Search .................. 324/642, 324/644; 342/127
See application file for complete search history.

(56) References Cited

U.S. PATENT DOCUMENTS

| | | | |
|---|---|---|---|
| 4,588,953 A | 5/1986 | Krage | |
| 4,749,936 A * | 6/1988 | Taplin | 324/644 |
| 4,901,628 A * | 2/1990 | Krage | 92/5 R |
| 4,987,823 A * | 1/1991 | Taplin et al. | 91/361 |
| 5,617,034 A * | 4/1997 | Lark et al. | 324/635 |
| 5,977,778 A * | 11/1999 | Chan et al. | 324/635 |
| 6,005,395 A | 12/1999 | Chan et al. | |
| 6,445,193 B1 * | 9/2002 | Trummer et al. | 324/644 |
| 6,722,260 B1 * | 4/2004 | Brown | 92/5 R |
| 7,098,671 B2 * | 8/2006 | Bassali et al. | 324/642 |
| 7,379,016 B1 * | 5/2008 | McEwan | 342/134 |
| 7,466,144 B2 * | 12/2008 | Bassali et al. | 324/644 |
| 7,492,165 B2 * | 2/2009 | Maier et al. | 324/644 |
| 7,750,647 B2 * | 7/2010 | Reininger et al. | 324/644 |
| 2004/0239339 A1 * | 12/2004 | Bassali et al. | 324/644 |
| 2007/0170930 A1 * | 7/2007 | Bassali et al. | 324/642 |

FOREIGN PATENT DOCUMENTS

| | | |
|---|---|---|
| DE | 102 05 904 A 1 | 8/2003 |
| DE | 10 2006 038 469 A1 | 2/2008 |
| DE | 10 2007 020 046 A1 | 10/2008 |
| EP | 1 752 665 A1 | 2/2007 |

OTHER PUBLICATIONS

English Translation of International Preliminary Report dated Jul. 15, 2010, Int'l Application No. PCT/EP2008/006778, filed Aug. 18, 2008, Applicant: Astyx GmbH et al., (11) pages.
German Language Foreign Search Report dated Jan. 30, 2009, International Application No. PCT/EP2008/006778, filed Aug. 18, 2008, (7) pages.

* cited by examiner

*Primary Examiner* — Timothy J Dole
(74) *Attorney, Agent, or Firm* — The Small Patent Law Group; Dean D. Small

(57) ABSTRACT

A distance measuring apparatus for detecting the position of a reflection body in a line structure is provided that includes a sensor device, which has at least one antenna for feeding a transmission signal as an electromagnetic wave into the line structure and for receiving the electromagnetic wave reflected on the reflection body. The sensor device also includes evaluation electronics which are configured to determine the position of the reflection body from the phase difference between the transmitted and the received wave.

17 Claims, 3 Drawing Sheets

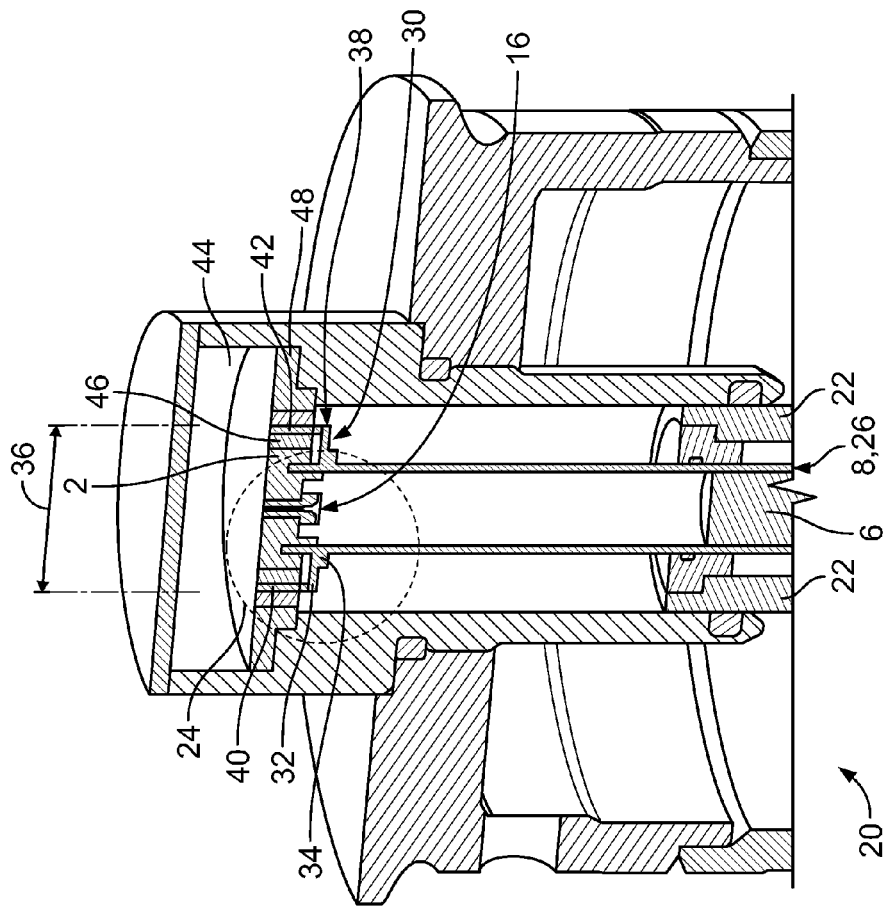
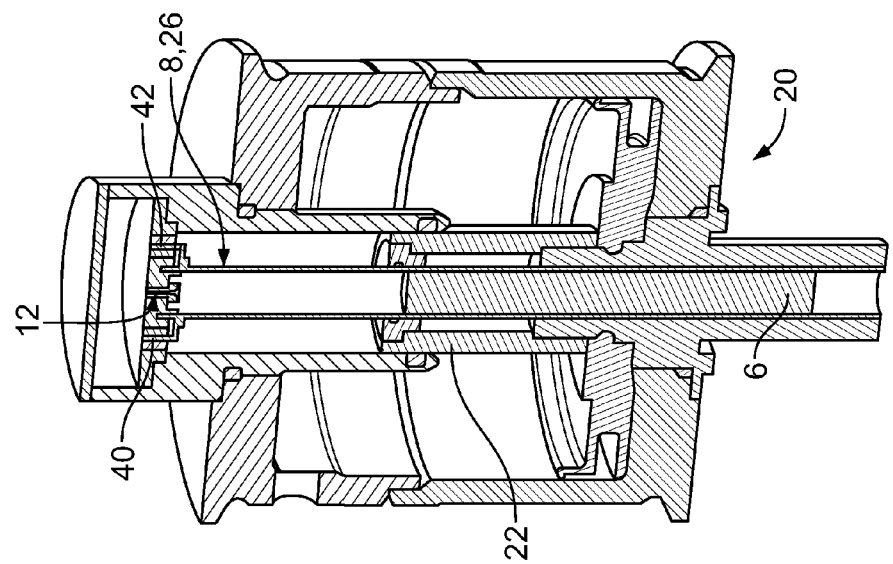
FIG. 3B
FIG. 3A

DOUBLE PISTON ROD

CROSS REFERENCE TO RELATED APPLICATIONS

This application is a filing under 35 U.S.C. §371, which claims priority to and the benefit of the filing date of PCT Application No. PCT/EP2008/006778, filed Aug. 18, 2008 and German Application No. DE 10 2007 038 718.2, filed Aug. 16, 2007, the subject matter of each of which is hereby incorporated by reference in their entirety herein.

BACKGROUND OF THE INVENTION

The subject matter disclosed herein relates generally to distance measuring devices.

In fixed-pipe process plants of the food and pharmaceutical industry, pneumatic valves are used as
(a) single-seated blocking valves for simple blocking at pipeline intersections;
(b) single-seated two-way valves for combining products from two pipelines in one pipeline and for dividing one pipeline into two pipelines; and
(c) double-seated valves for mix-proof separation of adverse products at pipeline intersections.

The precise function of the valves is described e.g. in the company brochures of the companies GEA/Tuchenhagen and Alfa Laval.

In order to control the process it is necessary to detect the position of the valves. For this purpose sensors such as potentiometers, LVDTs or just simple reed switches are used. All of these sensors are complex to fit, are partially subject to mechanical wear and tear, and require additional external space.

BRIEF DESCRIPTION OF THE INVENTION

In accordance with various embodiments, a distance measuring apparatus for detecting the position of a reflection body in a line structure is provided that includes a sensor device, which has at least one antenna for feeding a transmission signal as an electromagnetic wave into the line structure and for receiving the electromagnetic wave reflected on the reflection body. The sensor device also includes evaluation electronics which are configured to determine the position of the reflection body from the phase difference between the transmitted and the received wave.

In accordance with other various embodiments, a pneumatic valve having a distance measuring apparatus for detecting the position of a reflection body in a line structure is provided that includes a sensor device, which has at least one antenna for feeding a transmission signal as an electromagnetic wave into the line structure and for receiving the electromagnetic wave reflected on the reflection body. The sensor device also includes evaluation electronics which are configured to determine the position of the reflection body from the phase difference between the transmitted and the received wave.

In accordance with yet other various embodiments, a method for detecting the position of a reflection body within a line structure which is implemented by a distance measuring apparatus is provided. The method includes feeding a transmission signal as an electromagnetic wave into the line structure, receiving the electromagnetic wave reflected on a reflection body, and determining the position of the reflection body from the phase difference between the transmitted and the received wave.

BRIEF DESCRIPTION OF THE DRAWINGS

The following exemplary embodiments of the invention are described in greater detail by means of drawings. These show as follows:

FIGS. 3A and 3B sectional illustrations of the structure of the distance measuring apparatuses according to various embodiments of the invention according to FIGS. 2A and 2B.

Parts corresponding to one another are provided with the same reference numbers in all of the figures.

DETAILED DESCRIPTION OF THE INVENTION

Figure 1:
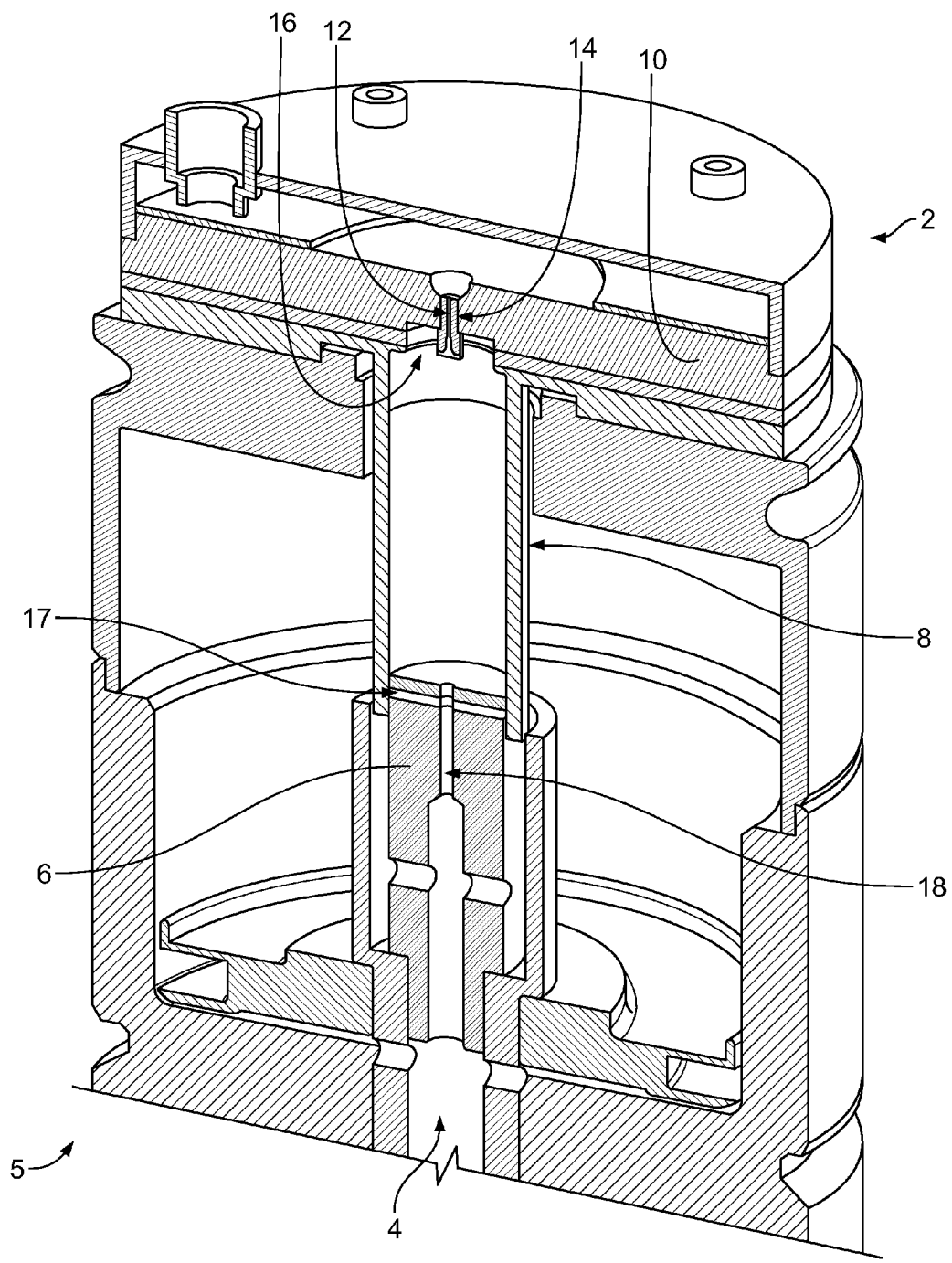
FIG. 1 a sectional illustration of the mechanical structure of the distance measuring apparatus according to various embodiments of the invention in a single-seated valve.

FIG. 1 shows the mechanical structure of the sensor (microwave sensor) 2 for all applications with which just one piston 4 needs to be detected (single-seated valves, blocking valves, two-way valves). Here the piston rod 6 passes within a so-called guide pipe 8. The guide pipe 8 is connected securely to the end cover 10. At the end of the guide pipe 8 there is an antenna 12 as described in German Application No. 102 05 904.7. A coaxial wave is fed to the antenna (coupling probe) 12, for example by means of a plastic insert 14, and via the probe 12 into a hollow conductor wave 15, for example in the E01 mode, radiated into the guide pipe 8, the injection of the electromagnetic wave 15 being a mechanical step 16. The wave 15 is reflected on the piston rod 6 and received again by the antenna 12, is converted here once again into a coaxial wave, and by means of downstream signal processing the phase difference between the transmitted and the received wave 15 is evaluated in order to thus determine the position of the piston rod 6. At the end of the piston rod 6 an HF short circuit can in turn be provided in the form of two discs 17 with dielectric filler, for example with PPS40 material. By appropriately selecting the field type of the wave, for example E01, it is moreover possible to provide a hole 18 centrally in the piston rod 8 in order, for example, to convey compressed air onto downstream systems.

With double-seated valves 20 the position of two piston rods 6, 22 passing into one another is to be detected simultaneously. FIGS. 2A, 2B, 3A and 3B show the configuration. Here the inner piston rod 6 passes within a guide pipe 8, as already described for the single-seated valves 5. The microwave sensor 2 and its injection via the antenna 12 are also identical. In order to detect the second, outer piston rod 22 a coaxial system 24 is realized. Here the guide pipe 8 serves as an inner conductor 26 of the coaxial system 24 for the detection of the second, outer piston rod. The coaxial structure of the coaxial system 24 serves in turn as an inner conductor of the coaxial structure for the detection of the next outermost piston rod, etc. The electromagnetic wave 28 is injected by means of inductive coupling to this inner conductor 26. For this purpose a two- or more stage crossover 30 is realised in order to provide HF adaptation. The inductive coupling comprises two or more round discs 32, 34 the outer diameter of which becomes smaller and smaller, and which are connected securely and with electrical conductivity to the guide pipe 8, for example by screwing.

Figure 2A:
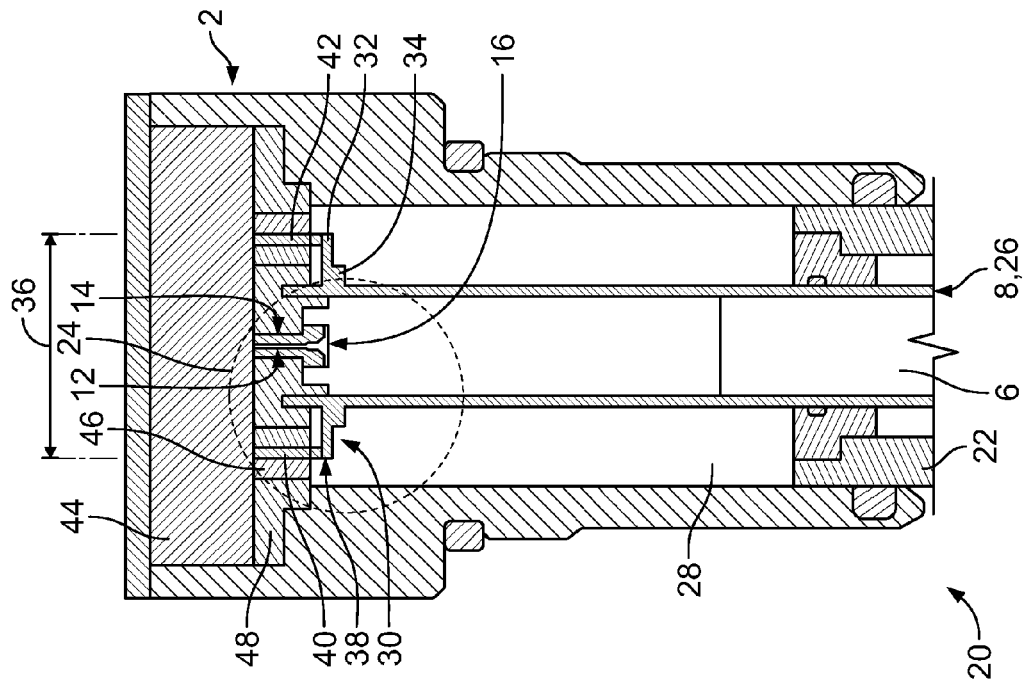
FIGS. 2A and 2B diagrammatic illustrations of the structure of the distance measuring apparatus according to various embodiments of the invention in double-seated valves.
Figure 2B:
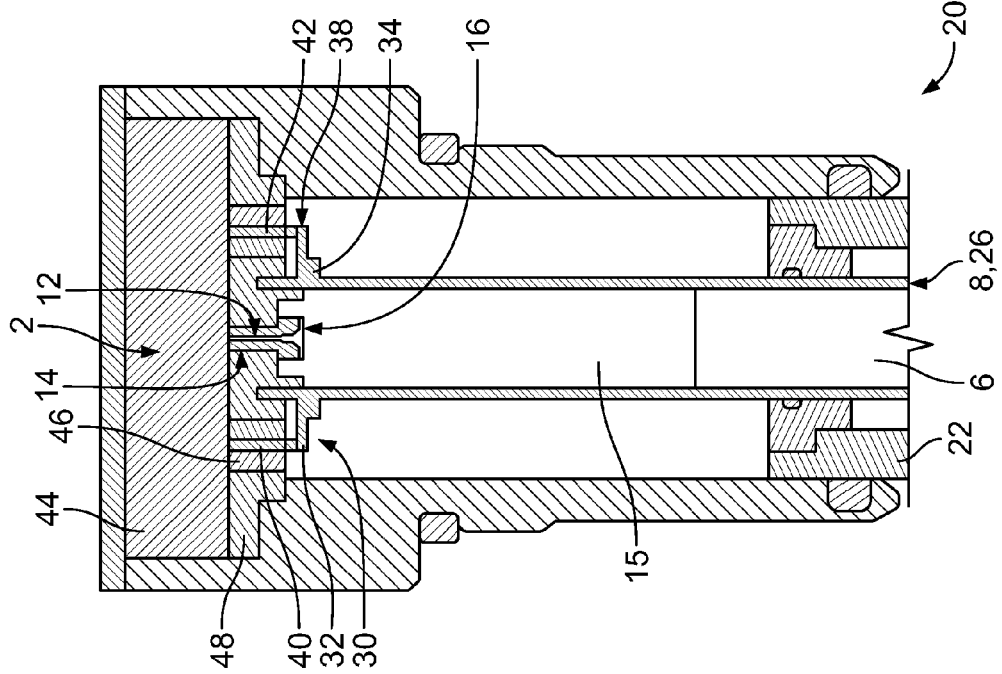

Here the discs (rings) with a decreasing outer diameter serve as electric transformation stages in order to achieve a reduced or minimum reflection factor with the injection of the electromagnetic wave into the coaxial system. The inductive crossover 30, i.e. the disc 32 with the largest diameter 36, is contacted directly on the outside 38 by the coaxial feed line 40, 42. Since contacting must take place symmetrically, at least 2 feed lines 40, 42 are used. There can of course, however, also be 4, 8, 16 etc. contactings symmetrically distributed over 360 degrees. The TEM mode or preferably the coaxial H11 mode is produced as a wave type. FIGS. 2A and 2B show the wave progress for both sensors 2, 24. Here too the coaxial feed line 40, 42 of the electromagnetic wave 28 from the transmission/receiving module 44 is implemented, for example, by means of pressure-tight glassification or a plastic insert 46.

The transmission and receiving electronics 44 are located in the space behind the injection plate 48. The coaxial antenna feed line 12, 40, 42 through the injection plate 48 is connected directly to the transmission/receiving electronics 44. The latter are generally fitted on the conductor plate, e.g. in the form of SMD components.

The transmission frequencies range from a few hundred MHz to approx. 100 GHz depending on the mechanical design of the drives. Moreover, over a wide range of well-established valve sizes, the diameter of the piston rods 6, 22 and of the guide pipe 8 can remain constant, and so the sensor 2, 24 can be used universally.

Thus, various embodiments provide a distance measuring apparatus for detecting the position of a reflection body in a line structure which is particular easy to fit, does not require any additional external space, and is not subject to mechanical wear and tear during operation. Other various embodiments provide a method for detecting the position of the reflection body within the line structure as well as a pneumatic valve with this type of distance measuring apparatus.

A sensor device and the evaluation electronics formed in accordance with various embodiments can be totally integrated into the valve, and in fact into the line structure or into an electronics space positioned facing away from the line structure and behind the antenna injecting the electromagnetic wave. Furthermore, it is advantageous that the distance measuring apparatus functions without any contact. Moreover, with the distance measuring apparatus and the method according to the various embodiments, the position of the reflection body within the line structure can be established with great precision.

When using the distance measuring apparatus in a valve, in particular with a pneumatic valve, the cylinder of the latter, in which a piston is operated moveably, advantageously serves as a line structure.

In contrast to the prior art, various embodiments of the microwave sensor (sensor device) can be integrated fully into the piston space of the cylinder of the pneumatic valve, and measures the position of the valve without any contact and with great precision.

In order to detect the piston moveable within the cylinder, the face side of the piston rod of the piston acts as a reflection body.

In order to reflect the electromagnetic wave, the face side of the piston rod is advantageously in the form of a short circuit for the electromagnetic wave. Suitable as a short circuit for the electromagnetic wave is a structure in the form of two or more metallic discs with dielectric filler, it being possible to fit the structure on the face surface of the piston rod.

Further, two or more piston rods passing into one another can be detected simultaneously and independently of one another so that the distance measuring apparatus can also be used, for example, with double seated valves.

In order to feed the transmission signal into the line structure with economy of space, frequency precision and no contact, injection of the electromagnetic wave in order to detect the innermost piston rod is advantageously implemented capacitively or by means of a coupling slot.

In order to obtain the smallest possible reflection factor when injecting the electromagnetic wave it is advantageous to implement into the line structure by means of an electric transformation stage. The electric transformation stage may be implemented as a mechanical step which is advantageously provided with a decreasing step height in the direction of the reflection body close to the window within the line structure.

In order to achieve movement of the electromagnetic wave within the line structure, to detect the innermost piston rod, and to obtain a very accurate result when determining the position, the frequency range of the electromagnetic wave advantageously comes between a few MHz and 100 GHz.

In order to detect the innermost piston rod, the electromagnetic wave is advantageously injected in the E01 mode.

In order to detect a second, outer piston rod on the double-seated valve, it is advantageous for the sensor device to comprise a coaxial system.

In order to realize the coaxial system for the detection of a second, outer piston rod, for example on the double-seated valve, a guide pipe, wherein the inner, first piston rod is operated, advantageously acts as an inner conductor of the coaxial system.

In order to detect further piston rods adjoining to the outside, the coaxial structure of the second, outer piston rod advantageously serves as an inner conductor of the coaxial structure, etc.

In order to detect the second, outer piston rod, the electromagnetic wave is advantageously injected inductively into the coaxial system. For this purpose metallic rings, which are advantageously connected securely and with electrical conductivity to the guide pipe which serves as an inner conductor of the coaxial system, and the outer diameter of which decreases in the direction of the piston rod, are advantageous.

For the electrically conductive connection of the metallic rings and the guide pipe with the coaxial feed pipe connected to the latter, an inductive crossover from the ring with the largest diameter to the coaxial feed pipe is provided. Advantageously, the inductive crossover between the coaxial feed line and the ring with the largest diameter is implemented symmetrically, and at least twice offset by 180° or four times offset respectively by 90° between the individual contactings or eight times offset respectively by 45° between the individual contactings on the ring.

The detection of the second, outer piston rod and further, outer piston rods by means of the electromagnetic wave with frequencies within the frequency range of a few MHz to 100 GHz takes place dependently upon the diameter of the piston rod within the coaxial system.

In order to detect the outer piston rods the electromagnetic wave is advantageously injected in the TEM or over-moded H11 mode.

In order to convey compressed air onto downstream systems, the piston rod may have one or more holes when injecting the electromagnetic wave in the E01 mode. Advantageously the hole/s is/are provided centrally in the piston rod.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

The invention claimed is:

1. A distance measuring apparatus for detecting the position of a reflection body in a line structure, comprising a sensor device, which has at least one antenna for feeding a transmission signal as an electromagnetic wave into the line structure and for receiving the electromagnetic wave reflected on the reflection body, and including evaluation electronics which are configured to determine the position of the reflection body from the phase difference between the transmitted and the received wave; wherein the line structure is in the form of a cylinder; wherein the reflection body is the face side of a piston rod of the cylinder; and further comprising two or more piston rods passing into one another being detected simultaneously and independently of one another.

2. The distance measuring apparatus according to claim 1, wherein a short circuit for the electromagnetic wave in the form of two or more metallic discs with dielectric filler between the discs is provided onto the face surface of the piston rod.

3. The distance measuring apparatus according to claim 1, further comprising one of a capacitive means or a coupling slot for injecting the electromagnetic wave in order to detect an innermost piston rod.

4. The distance measuring apparatus according to claim 3, wherein the injection of the electromagnetic wave into the cylinder for detecting the innermost piston rod is an electric transformation stage.

5. The distance measuring apparatus according to claim 4, wherein the electric transformation stage is a mechanical step.

6. The distance measuring apparatus according to claim 3, wherever the electromagnetic wave is fed into the line structure in the frequency range of about a few MHz to about 100 GHz based on the diameter of the piston rod in a round hollow conductor mode, in the E01 mode.

7. The distance measuring apparatus according to claim 1, wherein the sensor device includes a coaxial system.

8. The distance measuring apparatus according to claim 7, wherein a guide pipe of an innermost piston rod acts as an inner conductor of the coaxial structure for detecting a next piston rod.

9. The distance measuring apparatus according to claim 8, wherein the coaxial structure acts as the inner conductor of the coaxial structure for detecting the next piston rod.

10. The distance measuring apparatus according to claim 7, wherein the electromagnetic wave is injected into the coaxial system inductively with metallic rings with a decreasing outer diameter.

11. The distance measuring apparatus according to claim 10, wherein the contacting of one of the rings with the largest outer diameter is symmetric, and at least twice offset by 180 degrees or four times offset, respectively, by 90 degrees between the individual contactings or eight times offset, respectively, by 45 degrees between the individual contactings.

12. The distance measuring apparatus according to claim 7, wherein the electromagnetic wave is fed into the coaxial system in one of a TEM or over-moded H11 mode, in the frequency range of about a few MHz to about 100 GHz based on the diameter of the piston rods for the detection of outer piston rods.

13. The distance measuring apparatus according to claim 1, wherein the piston rod includes one or more holes in order to convey compressed air for controlling downstream systems.

14. A pneumatic valve having a distance measuring apparatus for detecting the position of a reflection body in a line structure, comprising a sensor device, which has at least one antenna for feeding a transmission signal as an electromagnetic wave into the line structure and for receiving the electromagnetic wave reflected on the reflection body, and including evaluation electronics which are configured to determine the position of the reflection body from the phase difference between the transmitted and the received wave; wherein the line structure is in the form of a cylinder; wherein the reflection body is the face side of a piston rod of the cylinder; and further comprising two or more piston rods passing into one another being detected simultaneously and independently of one another.

15. A method for detecting the position of a reflection body within a line structure which is implemented by a distance measuring apparatus, the method comprising:
feeding a transmission signal as an electromagnetic wave into the line structure, wherein the line structure is in the form of a cylinder;
receiving the electromagnetic wave reflected on the reflection body, wherein the reflection body is the face side of a piston rod of the cylinder; and
determining the position of the reflection body of two or more piston rods from the phase difference between the transmitted and the received wave; wherein the two or more piston rods pass into one another and are detected simultaneously and independently of one another.

16. The method according to claim 15, wherein the electromagnetic wave is fed into the line structure in the frequency range from about a few MHz to about 100 GHz.

17. The method according to claim 15, wherein the electromagnetic wave is fed into the line structure in a round hollow conductor mode in one of an E01 mode or in a TEM or over-moded H11 mode.

* * * * *